US012735320B2

(12) United States Patent
Yadav et al.

(10) Patent No.: US 12,735,320 B2
(45) Date of Patent: Sep. 15, 2026

(54) METHODS FOR FORMING CARBON NANOTUBE DISPERSIONS

(71) Applicant: Vibrantz Technologies Inc., Ashtabula, OH (US)

(72) Inventors: Santosh K. Yadav, Geneva, OH (US); Paul A. Rettinger, Ashtabula, OH (US)

(73) Assignee: Vibrantz Color Solutions LLC, Ashtabula, OH (US)

( * ) Notice: Subject to any disclaimer, the term of this patent is extended or adjusted under 35 U.S.C. 154(b) by 0 days.

(21) Appl. No.: 17/807,317

(22) Filed: Jun. 16, 2022

(65) Prior Publication Data

US 2023/0079722 A1 Mar. 16, 2023

Related U.S. Application Data

(60) Provisional application No. 63/211,197, filed on Jun. 16, 2021.

(51) Int. Cl.
*C01B 32/174* (2017.01)

(52) U.S. Cl.
CPC ........ *C01B 32/174* (2017.08); *C01P 2004/13* (2013.01)

(58) Field of Classification Search
CPC .......................... C01B 32/174; C01P 2004/13
See application file for complete search history.

(56) References Cited

U.S. PATENT DOCUMENTS

2009/0321545 A1* 12/2009 D'Errico ................ B02C 17/24 241/15
2020/0172401 A1* 6/2020 Kang .................... C01B 32/174
2021/0275977 A1* 9/2021 Song .................... C01B 32/174

OTHER PUBLICATIONS

Li, Qinghua, Jintao Liu, and Shilang Xu. "Progress in research on carbon nanotubes reinforced cementitious composites." Advances in Materials Science and Engineering 2015 (2015).*

Peng, Tao, and Isaac Chang. "Uniformly dispersion of carbon nanotube in aluminum powders by wet shake-mixing approach." Powder Technology 284 (2015): 32-39.*

Wang, Jiwei, et al. "A novel approach to obtain in-situ growth carbon nanotube reinforced aluminum foams with enhanced properties." Materials Letters 161 (2015): 763-766.*

"Nexgen Vacuum Recirculating Pump" <https://hockmeyer.com/products/nexgen-recirculation-mill/> Sep. 27, 2020 (Accessed Sep. 18, 2023).*

"Torusmill(R) basket mills". Torusmill. <https://www.dispermat.com/basket-mills.html> Z(2019) Accessed Feb. 15, 2024.*

"High Shear Impellers" Mixed Direct. Oct. 3, 2019 (Accessed Nov. 6, 2024). <https://www.mixerdirect.com/collections/high-shear?srsltid=AfmBOoqV3bJpcxZ9sKQ3DKvqJKB161BnFr0fS908aHtCkcwt0NpsJnY9>.*

(Continued)

*Primary Examiner* — Richard M Rump
(74) *Attorney, Agent, or Firm* — Benesch Friedlander Coplan & Aronoff LLP

(57) ABSTRACT

The present disclosure describes embodiments of novel methods and processes for forming CNT dispersions in media using a basket milling process. In particular, the methods and processes disperse CNT without damaging individual particles or affecting the properties of the particles. Testing of such methods demonstrates that recirculatory milling processes can be used to disperse SWCNT effectively and efficiently in a media.

20 Claims, 8 Drawing Sheets

(56) References Cited

OTHER PUBLICATIONS

Bai, Jing, Zixing Shi, and Jie Yin. "Revisiting the pristine carbon nanotubes as dienophile: A promising crosslinking agent to build the inorganic-organic network for polybutadiene based on dynamic crosslinked mode." Polymer 98 (2016): 229-236.*
Price, B.K., et al., "Functionalization of Single-Walled Carbon Nanotubes "On Water"", J. Am. Chem. Soc., Sep. 8, 2006.
Hirsch, A., et al., "Functionalization of Carbon Nanotubes", Top Curr Chem (2005) 245: 193-237.
Tasis, D., et al. "Chemistry of Carbon Nanotubes", Chemical Reviews, 2006, vol. 106, No. 3, 1105-1136.
Balasubramanian, K., et al., "Chemically Functionalized Carbon Nanotubes", small 2005, 1, No. 2, 180-192.

* cited by examiner

METHODS FOR FORMING CARBON NANOTUBE DISPERSIONS

CROSS REFERENCE TO RELATED APPLICATION

This application claims priority to U.S. Provisional Patent Application Ser. No. 63/211,197, titled “Method for Forming Carbon Nanotube Dispersions,” filed on Jun. 16, 2021, which is expressly incorporated by reference herein in its entirety.

FIELD OF INVENTION

The present disclosure generally relates to novel methods for forming stable dispersions of carbon nanotubes in aqueous and non-aqueous media. More specifically, the present disclosure relates to using a basket milling process for such novel methods for forming stable dispersions of carbon nanotubes in aqueous and non-aqueous media.

BACKGROUND

Carbon nanotubes (CNT) are used in advanced nanomaterial technology to form state-of-the-art composite materials. CNT’s have shown to be increasingly useful in coatings and energy applications. The advantageous characteristics of CNT include high tensile strength, high conductivity, excellent thermal transfer properties, low-band gaps, and optimal chemical and physical stability. CNT are also versatile in that their unique x-electron-rich structures facilitate modifications and alterations of their chemical and electronic properties. However, CNT do provide difficulties in the handling and processing of the material, and in particular, successful exfoliate of CNT to achieve stable dispersions in various media remains challenging. Prior art methods typically damage CNT during the dispersion process, form dispersions that are not stable, or both. Thus, there is a need in the industry for methods and processes for producing stable dispersions of CNT in various media that are useful for end applications. In particular, there is a need in the industry for methods and processes the form CNT dispersions without damaging the CNT. Disclosed herein are novel methods and processes for forming such CNT dispersions.

SUMMARY

The present disclosure describes embodiments of novel methods and processes for forming CNT dispersions in media using a basket milling process. In particular, the methods and processes disperse CNT without damaging individual particles or affecting the properties of the particles. Testing of such methods demonstrates that recirculatory milling processes can be used to disperse CNT effectively and efficiently in a media.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

Figure 1:
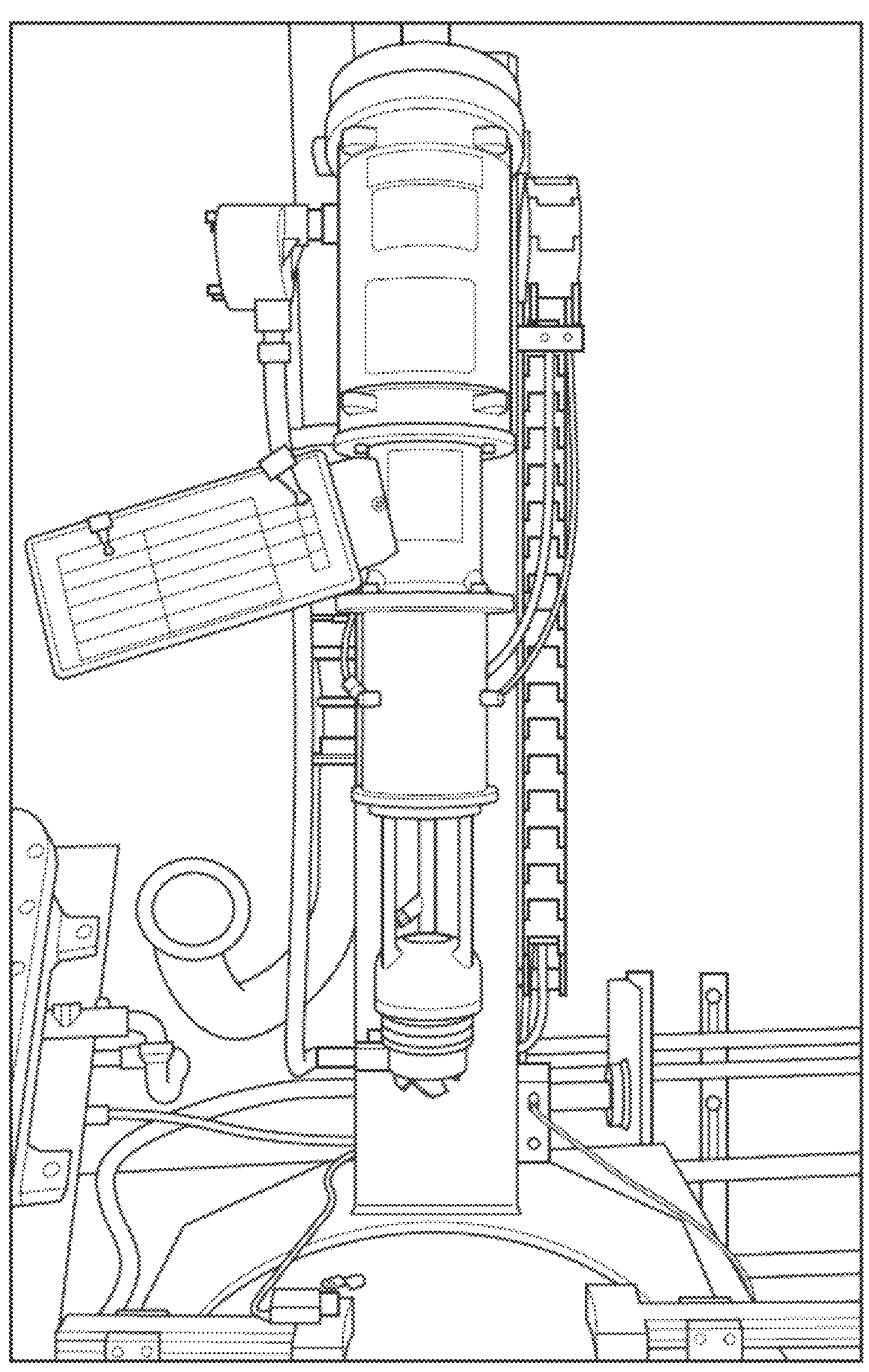
FIG. 1 is a photograph depicting a basket milling machine.
Figure 2:
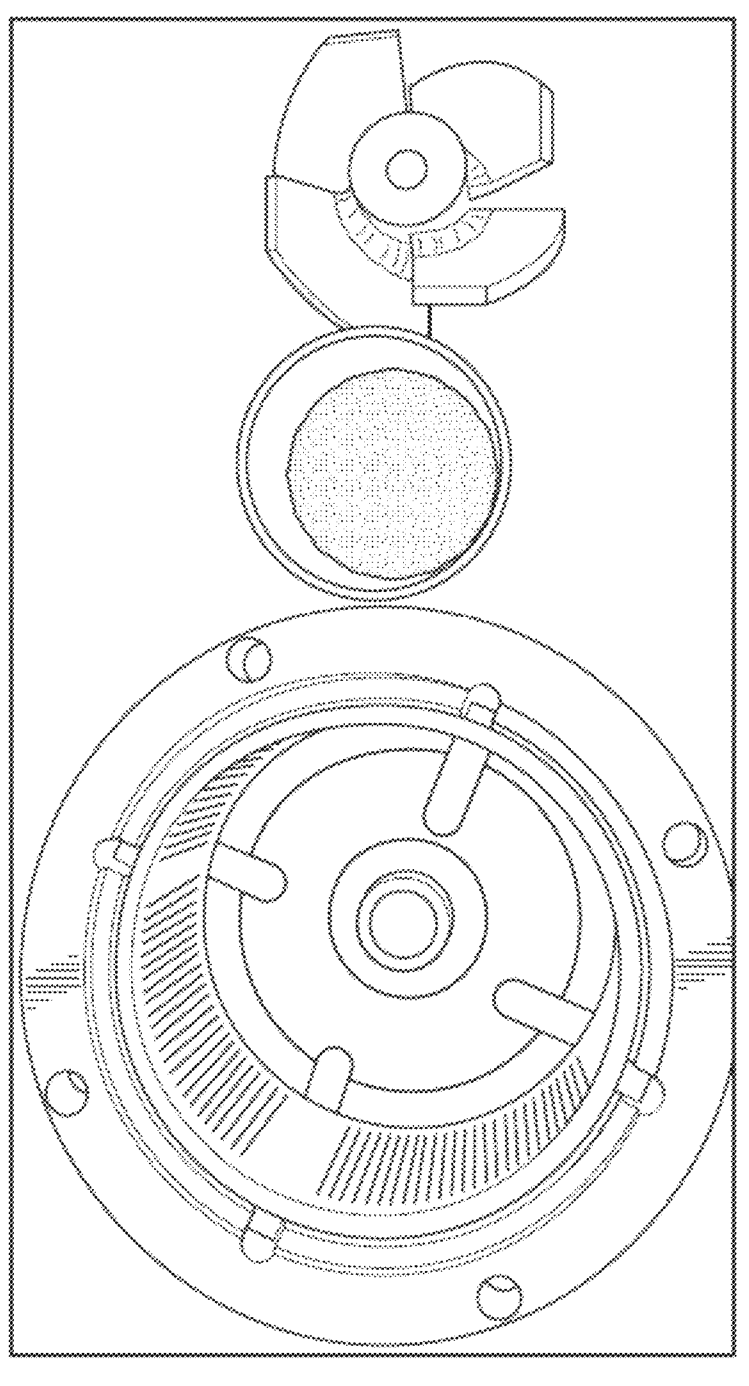
FIG. 2 is a photograph of components of a basket milling machine.
Figure 3:
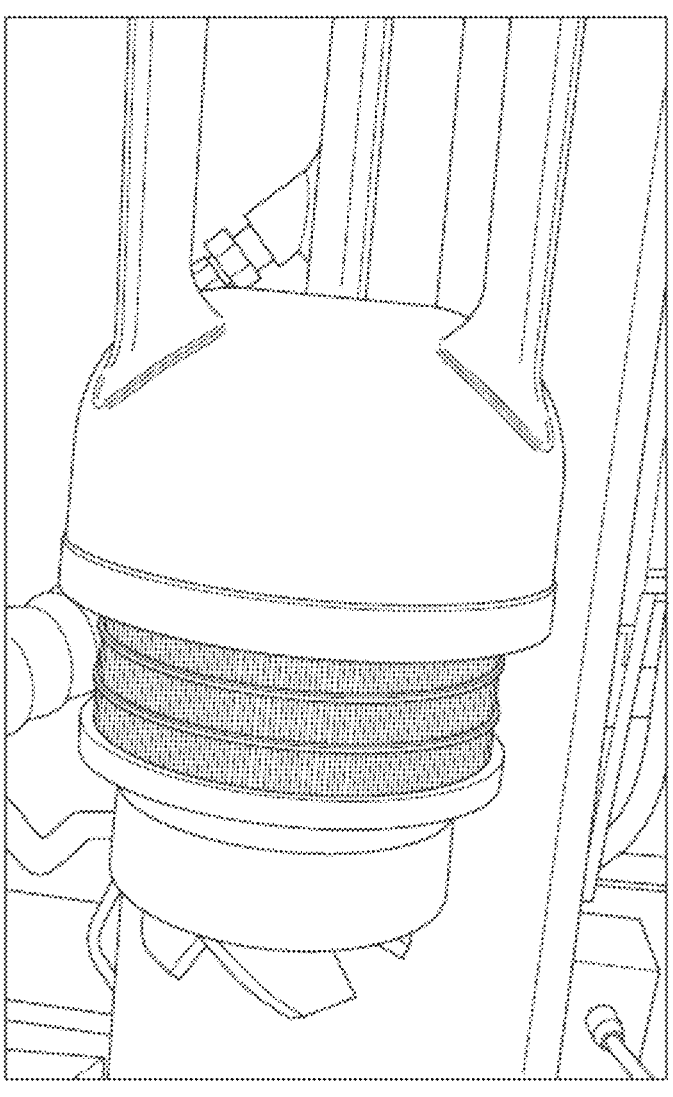
FIG. 3 is a photograph of components of a basket milling machine.
Figure 4:
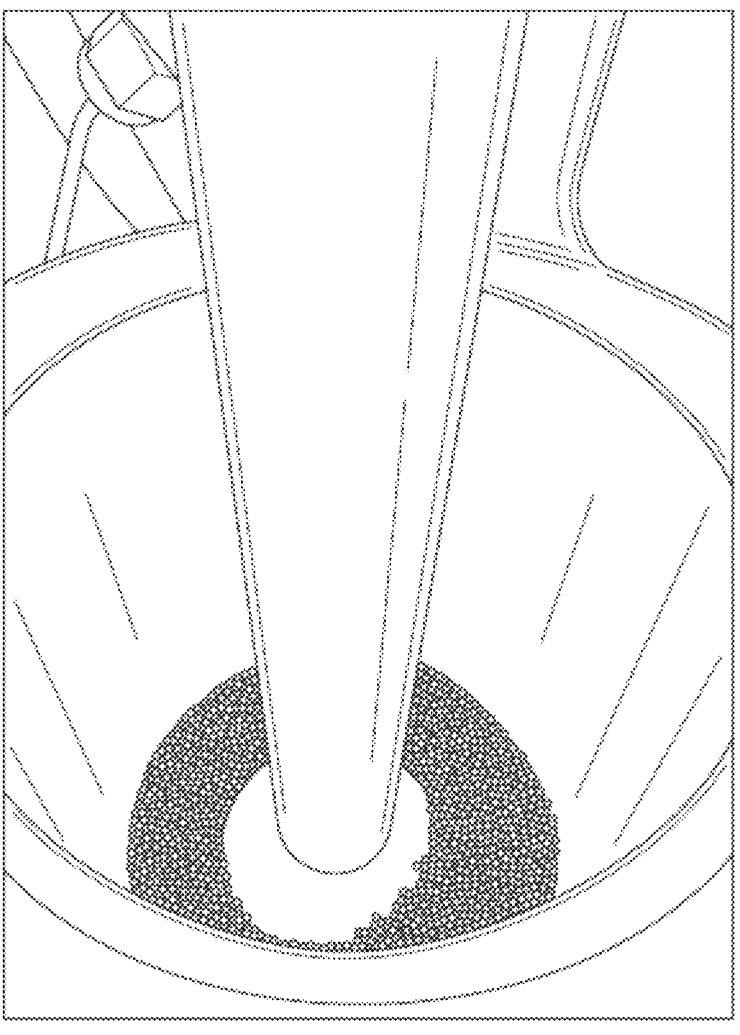
FIG. 4 is a photograph of components of a basket milling machine.

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for dispersion of carbon nanotubes using a basket milling process are hereinafter disclosed and described in detail.

There are a number of methods in the prior art that result in limited success in achieving stable CNT dispersions. One method of dispersing CNT in various media is by ultrasonication with surfactants. For surfactants that have hydrophilic and hydrophobic heads, the interactions between them appear to cause the dispersion of CNT in water. The physical mechanism behind the surfactant aided dispersion is that the surfactant adsorbs on the CNT surface by hydrophobic or interactions and forms a complete or nearly a complete layer that stabilizes separated CNT and discourages reaggregation. Ultrasonication of the CNT solution with surfactant provides enough energy to separate the CNT by overcoming Van der Waals forces. During this process, such forces are overcome when surfactant molecules are adsorbed onto the CNT surfaces and introduce electrostatic and/or steric repulsion forces that overcome the Van der Waals attraction forces among CNT, which can result in exfoliation into individual CNT. However the downside to such a method is that harsh ultrasonication can cause disruption in the native electronic structure of the CNT by inducing defects on the wall of the carbon nanotubes. Ultrasonication in an aqueous medium is known to generate free radicals such as hydroxyl radical ($OH^-$) and the super-oxide ion ($O2^-$). These highly reactive species may chemically modify the $sp^2$ hybridization of carbon atoms to $sp^3$ on the surface of CNT and disrupt the $\pi$-$\pi$ (pi-pi) conjugation of the six membered carbon rings of the wall, which hinders the mobility of electrons through inter and intra tubes and significantly degrade electrical properties of the CNT.

The novel methods disclosed herein overcome the limitations of the prior art by employing a basket mill to form CNT dispersions. Basket mills are a common type of milling equipment used to disperse fine particles by means of a recirculatory milling process. In a basket mill, rotational energy is applied to milling media, such as in one example, 0.8 mm-1.2 mm zirconia ceramic beads positioned inside a cage, that produce shear forces necessary to disperse small particles. Basket mills are typically used to disperse particles that are small three-dimensional particles, such as pigments (e.g. CI Pigment Black 6, CI Pigment Blue 15, etc.). The novel methods disclosed herein use a basket mill to successfully disperse CNT without impacting significant damage to the CNT. As will be appreciated, the traditional three-dimensional particles typically processed by a basket mill are significantly different than CNT, which are high-aspect ratio particles, essential one-dimensional objects. While it was not initially expected for a basket mill to successfully disperse CNT, applicable experimentation demonstrated that basket mills are successful in producing CNT dispersions.

A basket mill is a relatively high-efficiency grinding dispersion apparatus typically used in the paint and coating industries to disperse pigments into paints and other liquid coatings. Basket mills typically include a grinding chamber filled with a grinding agent, such as milling beads. A disc or blade is fixed to a vertical shaft passing through the basket. Particles and the media into which the particles are to be dispersed are placed in the basket. The blade or disc are rotated and the grinding agent accelerates to produce shear forces, which disperses the particles in the media. FIGS. 1-4 are photographs of the basket mill used to reduce the novel method disclosed herein to practice.

Sample dispersions were prepared in the basket mill, and the samples were characterized using Raman spectroscopy. Table 1 lists the formulations for the samples.

TABLE 1

| Description | Sp. Gr. | A | B |
|---|---|---|---|
| CNT | 1.800 | 4.00 | 4.00 |
| Polyvinyl pyrrolidone | 1.207 | 6.00 | 0.000 |
| Carboxymethyl cellulose powder | 1.395 | 0.000 | 6.00 |
| Distilled Water | 1.000 | 990.00 | 990.00 |
| Total | 1.000 | 1000.00 | 1000.00 |

The dispersion preparation process begins with a preparation of a solution at room temperature. The solution has a base of deionized water. Carboxymethyl cellulose powder is slowly added to the deionized water as a Cowles blade agitates the solution. CNT is then added slowly to the solution, which is mixed for 30 min at room temperature. The solution is then milled for a total of one hour or more using in the basket mill. Samples were prepared after 15, 30, 45, 60, 120, 180, 240, and 360 minutes of milling. A 1.5-inch four-sided blade on a Byk Dispermat, operated at 3000 RPM, is used during the milling process. Such conditions for milling are two to twelve times more intensive in time and energy than what is expected to for such dispersions. In one example, the carboxymethyl cellulose powder used as a dispersing agent is a Dupont CMC (carboxymethyl cellulose).

Figure 5:
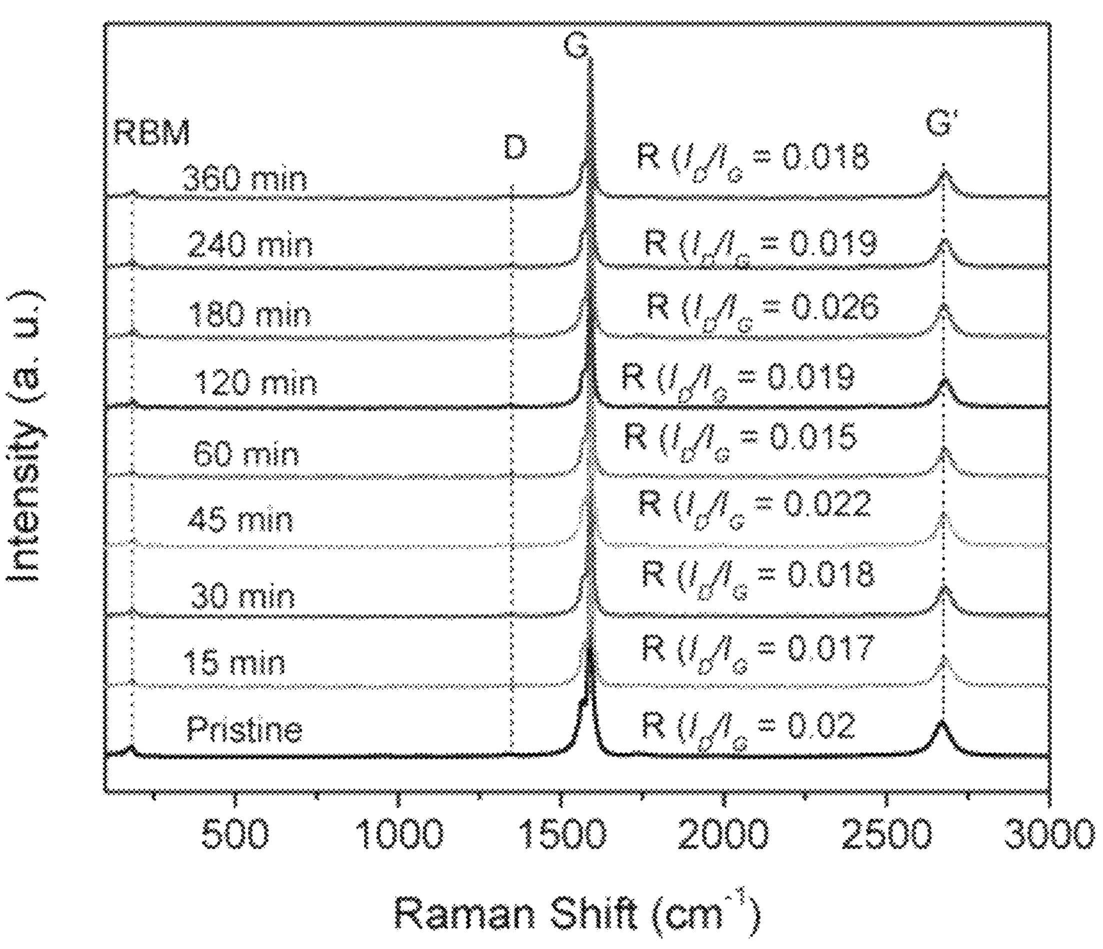
FIG. 5 is a graph illustrating results for pristine CNT as compared to samples prepared at various milling times.

The resulting samples were evaluated using Raman spectroscopy to determine the characteristics of the CNT diameters and to ascertain the quality of the samples prepared. FIG. 5 depicts a graph illustrating results for pristine CNT as compared to samples prepared at 15, 30, 45, 60, 120, 240, and 360 minutes of milling at 3000 RPM using a Byk Dispermat.

In the graph of FIG. 5, the Raman spectra present different features sensitive to chiral indices (n, m) specifying the perimeter vector (chiral vector), such as the radial breathing mode (RBM), where all the carbon atoms are moving in-phase in the radial direction; the G-band, where neighboring atoms are moving in opposite directions along the surface of the tube as in 2D graphite; the dispersive disorder-induced D-band; and its second-order related harmonic G'-band. Of these four features, the RBM is most sensitive to changes in the nanotube diameter.

Figure 6:
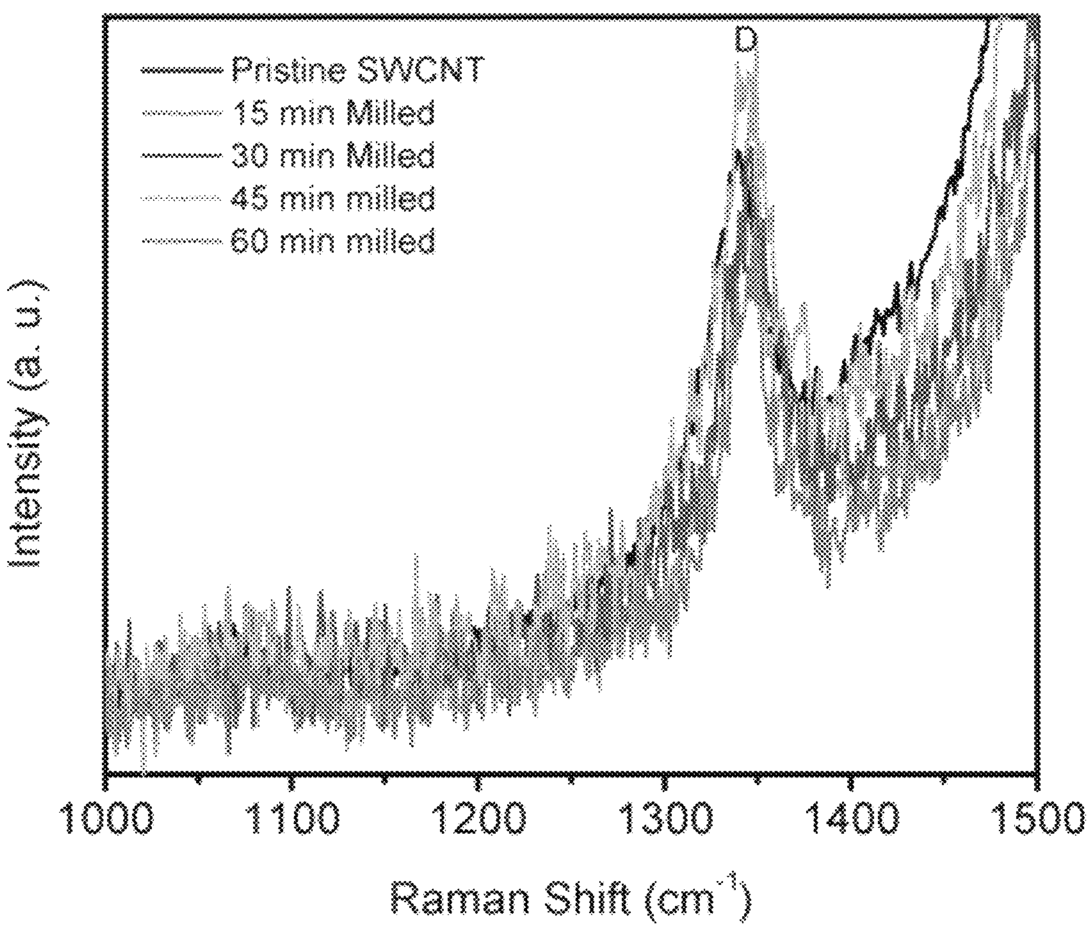
FIG. 6 is a graph illustrating the D band of pristine CNT as compared to samples prepared at various milling times.

FIG. 6 depicts a graph illustrating the D band of pristine CNT as compared to samples prepared at 15, 30, 45, and 60 minutes of milling. The D-band in graphite involves scattering from a defect which breaks the basic symmetry of the graphene sheet. It is observed in $sp^2$ carbons containing porous, impurities, or other symmetry-breaking defects. On the other hand, the second-order G'-band does not require an elastic defect-related scattering process and is observable for defect-free $sp^2$ carbons. These bands show a dependence on the chirality and diameter of nanotubes and on laser excitation energy.

Figure 7:
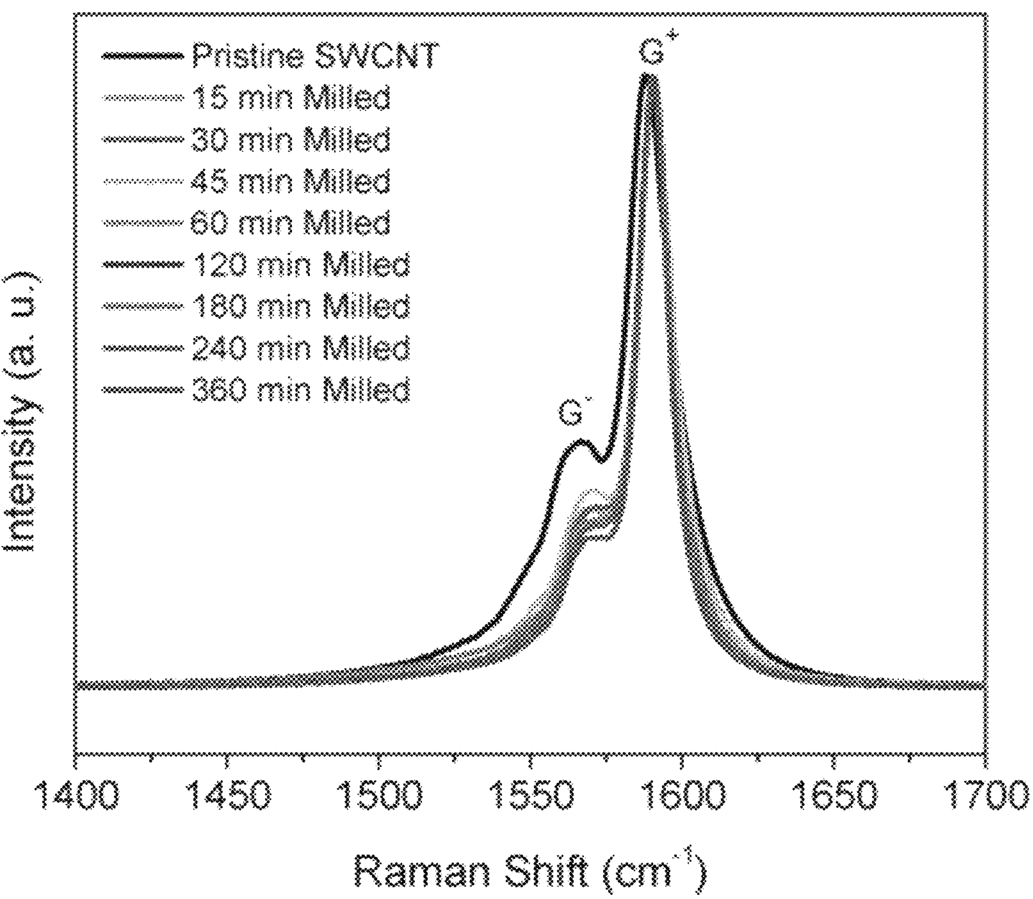
FIG. 7 is a graph illustrating the G band of pristine CNT as compared to samples prepared at various milling times.

FIG. 7 depicts a graph illustrating the G band of pristine CNT as compared to samples prepared at 15, 30, 45, 60, 120, 180, 360 minutes of milling under the conditions described above. The G-band is an intrinsic feature of a carbon nanotube closely related to vibrations in all $sp^2$ carbon materials. The most important aspect of G-band is the characteristic Raman line-shape which depends on whether the nanotube is semiconducting or metallic, thereby allowing an analyst to readily distinguish between semiconducting and metallic structures. This band shows two components, the lower frequency component associated with vibrations along the circumferential radius ($G^-$), and the higher frequency component, ($G^+$), attributed to vibrations along G direction of the nanotube axis. The D-band and G'-band features are both observed in the Raman spectra of semiconducting and metallic CNT at a single nanotube level.

The ratio of the intensities of D and G bands is a good indicator of the quality of bulk samples. Similar intensities of these bands indicate a high quantity of structural defects. The dispersions do not show higher differences in ratio of intensities of D and G bands. This indicates that $sp^2$ hybridization of carbon atoms of the CNT was not altered during the milling process and did not induce significant defects during the process.

Figure 8:
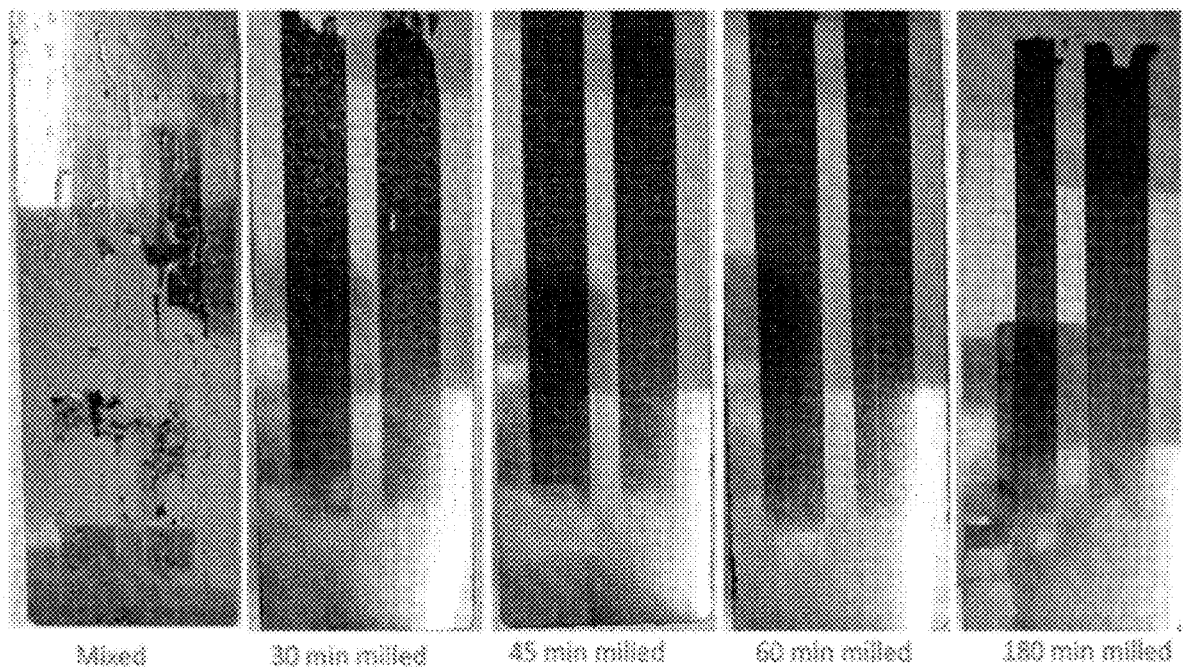
FIG. 8 are images of grind gauge data of a mixed sample, a sample milled for 30 minutes, a sample milled for 45 minutes, a sample milled for 60 minutes, and a sample milled for 180 minutes milled samples.

FIG. 8 is a collection of images of grind gauge data of a mixed sample, a sample milled for 30 minutes, a sample milled for 45 minutes, a sample milled for 60 minutes, and a sample milled for 180. The grind gauge data demonstrate a visible progression in the level of debundling and dispersion of SWCNT. From evaluations of these dispersions by Raman microscope, the data suggests that samples can be milled for longer periods of time without damage to the SWCNT.

The results disclosed herein demonstrate that a recirculatory milling process can be used to effectively and efficiently disperse SWCNT, which is an unexpected result. Prior to experimentation, it would have been expected that bundles of one-dimensional objects might clog the screens of the basket mill, thereby impeding the function of the milling process, and at the same time, inducing damage to the particles. However, as described herein, the Raman data collected indicates that the basket milling process does not induce defects upon the CNT walls. Furthermore, the Raman data suggests a continuing decrease in the median diameter of CNT bundles with increased basket mill time and energy. This is a unexpected result.

The foregoing description of examples has been presented for purposes of illustration and description. It is not intended to be exhaustive or limiting to the forms described. Numerous modifications are possible in light of the above teachings, including the dispersion of CNT in a variety of non-aqueous solvents, resins, and/or additive mixtures. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. A method of forming a carbon nanotube dispersion comprising:

providing a basket mill comprising a grinding chamber wherein a screen is contained within the wall and floor of the basket chamber, the grinding chamber comprising a milling media;

agitating within the basket mill, a solution of dispersant and water with a blade, adding an amount of pristine carbon nanotubes to the agitated dispersant and water solution to produce a carbon nanotube solution;

performing a mixing step at room temperature followed by performing a milling step in which a disc or blade passes through the basket for a period of time that is 3 hours or longer; and recovering a carbon nanotube dispersion from the basket mill after the milling step, wherein the $sp^2$ hybridization of carbon atoms of the carbon nanotubes is not altered during the milling process as demonstrated by D and G bands of a Raman spectra of the carbon nanotube dispersion.

2. The method of claim 1, wherein the dispersant comprises polyvinyl pyrrolidone.

3. The method of claim 1, wherein the dispersant comprises carboxymethyl cellulose.

4. The method of claim 1, wherein the milling media comprises ceramic beads.

5. The method of claim 1, wherein the carbon nanotubes are single walled carbon nanotubes.

6. The method of claim 1, wherein the disc or blade is disposed on a vertical shaft.

7. The method of claim 1, wherein the milling step is a recirculatory milling step.

8. A method of forming a carbon nanotube dispersion comprising:

providing a basket mill comprising a grinding chamber wherein a screen is contained within the wall and floor of the basket chamber, the grinding chamber comprising a milling media;

agitating within the basket mill, a solution of dispersant and water with a blade, adding to the agitated dispersant and water solution carbon nanotube wherein the carbon nanotube solution comprises 10 parts carbon nanotube and dispersant for 990 parts water;

performing a mixing step at room temperature followed by performing a milling step in which a disc or blade passes through the basket for a period of time; and recovering a carbon nanotube dispersion from the basket mill after the milling step, wherein the $sp^2$ hybridization of carbon atoms of the carbon nanotubes is not altered during the milling process as demonstrated by D and G bands of a Raman spectra of the carbon nanotube dispersion; and wherein the median diameter of carbon nanotube bundles within the dispersion decreases with increasing basket mill time.

9. The method of claim 8, wherein the dispersant comprises polyvinyl pyrrolidone.

10. The method of claim 8, wherein the dispersant comprises carboxymethyl cellulose.

11. The method of claim 8, wherein the milling media comprises ceramic beads.

12. The method of claim 8, wherein the carbon nanotubes are single walled carbon nanotubes.

13. The method of claim 8, wherein the disc or blade is disposed on a vertical shaft.

14. The method of claim 8, wherein the milling step is a recirculatory milling step.

15. A method of forming a carbon nanotube dispersion comprising:

providing a basket mill comprising a grinding chamber wherein a screen is contained within the wall and floor of the basket chamber, the grinding chamber comprising a milling media;

agitating within the basket mill, a solution of dispersant and water with a blade, adding an amount of pristine carbon nanotubes to the agitated dispersant and water solution to produce a carbon nanotube solution that comprises only 4 parts carbon nanotube for 1000 parts of the carbon nanotube solution;

performing a mixing step at room temperature followed by performing a milling step in which a disc or blade passes through the basket for a period of time; and recovering a carbon nanotube dispersion from the basket mill after the milling step.

16. The method of claim 15, wherein the $sp^2$ hybridization of carbon atoms of the carbon nanotubes is not altered during the milling process as demonstrated by D and G bands of a Raman spectra of the carbon nanotube dispersion; and wherein the median diameter of carbon nanotube bundles within the dispersion decreases with increasing basket mill time.

17. The method of claim 15, wherein the dispersant comprises at least one of polyvinyl pyrrolidone and carboxymethyl cellulose.

18. The method of claim 15, wherein the milling media comprises ceramic beads.

19. The method of claim 15, wherein the carbon nanotubes are single walled carbon nanotubes.

20. The method of claim 15, wherein the blade is a Cowles blade.

* * * * *